(12) United States Patent
Harris, III

(10) Patent No.: US 10,186,697 B1
(45) Date of Patent: Jan. 22, 2019

(54) BATTERY MODULE WITH COOLING ASPECTS

(71) Applicant: Thor Trucks Inc., North Hollywood, CA (US)

(72) Inventor: John Henry Harris, III, San Gabriel, CA (US)

(73) Assignee: Thor Trucks Inc., North Hollywood, CA (US)

(*) Notice: Subject to any disclaimer, the term of this patent is extended or adjusted under 35 U.S.C. 154(b) by 0 days.

(21) Appl. No.: 15/948,753

(22) Filed: Apr. 9, 2018

Related U.S. Application Data

(60) Provisional application No. 62/626,037, filed on Feb. 3, 2018.

(51) Int. Cl.
| | |
|---|---|
| H01M 2/10 | (2006.01) |
| H01M 2/02 | (2006.01) |
| H01M 10/6561 | (2014.01) |
| H01M 10/6557 | (2014.01) |
| H01M 10/613 | (2014.01) |

(52) U.S. Cl.
CPC ....... *H01M 2/1077* (2013.01); *H01M 10/613* (2015.04); *H01M 10/6557* (2015.04); *H01M 10/6561* (2015.04)

(58) Field of Classification Search
CPC ............ H01M 2/10; H01M 2/02; H01M 2/12; H01M 10/613; H01M 10/6557
See application file for complete search history.

(56) References Cited

U.S. PATENT DOCUMENTS

| | | | |
|---|---|---|---|
| 6,399,238 B1 | 6/2002 | Oweis et al. | |
| 6,406,812 B1 | 6/2002 | Dreulle et al. | |
| 9,525,291 B1 | 12/2016 | Huynh et al. | |
| 9,595,705 B1 | 3/2017 | Buckhout | |
| 9,692,095 B2 | 6/2017 | Harris | |
| 9,692,096 B2 | 6/2017 | Harris | |
| 2007/0087266 A1* | 4/2007 | Bourke | H01M 2/0242 429/159 |
| 2008/0003495 A1 | 1/2008 | Shimizu | |
| 2010/0000816 A1* | 1/2010 | Okada | H01M 2/1077 180/68.5 |
| 2012/0048630 A1* | 3/2012 | Nishiura | B60K 1/04 180/65.31 |
| 2012/0148889 A1 | 6/2012 | Fuhr et al. | |
| 2012/0177970 A1* | 7/2012 | Marchio | H01M 2/0237 429/120 |

(Continued)

*Primary Examiner* — Kenneth J Douyette
(74) *Attorney, Agent, or Firm* — Arent Fox LLP

(57) ABSTRACT

Aspects of a modular clip for an electric battery, a battery module comprising multiple such modular clips, and a battery pack comprising multiple battery modules are provided. The modular clip includes a housing configured to receive a plurality of battery cells. The housing includes a base portion and a first and second wall extending from the base portion of the housing along a length of the housing, wherein the plurality of battery cells are received between the first wall and the second wall. The first and/or second wall forms a cooling path along the length of the housing, e.g., a gap maintained between the plurality of cells and the first/second wall. The battery module may include a regulator and duct to direct/control air flow to the cooling path in each of the modular clips comprised in a battery module.

29 Claims, 16 Drawing Sheets

(56) References Cited

U.S. PATENT DOCUMENTS

| | | | |
|---|---|---|---|
| 2012/0224326 A1* | 9/2012 | Kohlberger | H01M 2/1077 361/699 |
| 2012/0247848 A1* | 10/2012 | Kosaka | B60H 1/00278 180/68.1 |
| 2012/0282507 A1 | 11/2012 | Andre et al. | |
| 2013/0164577 A1 | 6/2013 | Insana et al. | |
| 2014/0205878 A1* | 7/2014 | Ohgitani | H01M 2/1072 429/82 |
| 2016/0197386 A1* | 7/2016 | Moon | H01M 2/1077 429/120 |
| 2017/0001584 A1 | 1/2017 | Harris et al. | |
| 2017/0003082 A1 | 1/2017 | Harris | |
| 2017/0005303 A1 | 1/2017 | Harris | |
| 2017/0005304 A1 | 1/2017 | Harris | |
| 2017/0005305 A1 | 1/2017 | Harris | |
| 2017/0005315 A1 | 1/2017 | Harris et al. | |
| 2017/0005319 A1 | 1/2017 | Rong | |
| 2017/0005376 A1 | 1/2017 | Harris et al. | |
| 2017/0005377 A1 | 1/2017 | Rong | |
| 2017/0005378 A1 | 1/2017 | Rong | |
| 2017/0005380 A1 | 1/2017 | Harris | |
| 2017/0005384 A1 | 1/2017 | Harris et al. | |
| 2017/0025657 A1* | 1/2017 | Reinshagen | B60L 11/1874 |
| 2017/0092999 A1 | 3/2017 | Tarlau et al. | |
| 2017/0133644 A1 | 5/2017 | Robert et al. | |
| 2017/0217318 A1 | 8/2017 | Kowalewski | |
| 2017/0244141 A1 | 8/2017 | Weicker | |
| 2017/0253142 A1 | 9/2017 | Buckhout | |
| 2017/0256771 A1 | 9/2017 | Buckhout et al. | |
| 2017/0256826 A1 | 9/2017 | Hong et al. | |
| 2017/0279104 A1 | 9/2017 | Beverley et al. | |
| 2017/0288202 A1 | 10/2017 | Tarlau et al. | |
| 2017/0288285 A1 | 10/2017 | Buckhout et al. | |
| 2017/0288286 A1 | 10/2017 | Buckhout et al. | |
| 2017/0298807 A1 | 10/2017 | Gubel et al. | |
| 2017/0338527 A1 | 11/2017 | Walton | |
| 2018/0006341 A1 | 1/2018 | Iqra et al. | |
| 2018/0095139 A1 | 4/2018 | Buckhout, Sr. et al. | |
| 2018/0097265 A1 | 4/2018 | Tarlau et al. | |

\* cited by examiner

BATTERY MODULE WITH COOLING ASPECTS

CROSS-REFERENCE TO RELATED APPLICATION

This application claims the benefit of U.S. Provisional Application Ser. No. 62/626,037, entitled "Battery Module with Cooling Aspects" and filed on Feb. 3, 2018, which is expressly incorporated by reference herein in its entirety.

BACKGROUND

Field

Aspects of the present disclosure relate generally to an electric battery module and a modular electric battery assembly.

Description of the Related Art

Electric batteries may be used in a number of applications. As one example, electric batteries may be used to power electric vehicles in place of a combustion engine in order to reduce fuel consumption and vehicle emissions. Electric batteries may also be used for energy storage systems, e.g., to store energy for utilities and/or to supply power to residential or commercial buildings. Thus, electric batteries are desirable for both mobile applications and stationary energy storage applications.

There exists a need for further improvement in electric battery technology. A battery pack can be an expensive component for an electric vehicle or an energy storage system. Greater efficiency in the manufacturing process is needed. There is a need for processes and designs that improve manufacturing efficiency and that reduce manufacturing costs. The configuration of the battery pack needs to balance a number of factors, e.g., including safety, size, cost, shape, weight, manufacturing complexity, etc. Additionally, temperature regulation is an important feature for electric batteries. Battery cells in a battery pack may require cooling to avoid overheating. In order to have a battery pack operate safely, the battery pack must regulate the temperature to keep the battery cells below a temperature that may cause the battery cells to malfunction. Removing excess heat can also increase the service life of a battery pack.

SUMMARY

In light of the above described problems, the present disclosure provides a modular clip for an electric battery module having an improved cooling system, as well as a battery module comprising multiple of such modular clips, and a battery pack comprising multiple of such battery modules.

A temperature of a battery pack must be maintained within an optimal range to prevent malfunction of the battery cells and to avoid decreasing the service life of the battery pack. While additional components may be used for cooling, e.g., such as an air cooled cold plate, these components add complexity and cost to the manufacturing process and place limits on the design of the battery.

Aspects presented herein provide a modular clip for an electric battery that is configured to direct a substantially even amount of air flow over each of a plurality of battery cells held within the modular clip. Thus, aspects presented herein enable a battery module to regulate a temperature of the battery module using air flow through modular clip without the need for cold plates or additional cooling components.

In an aspect of the disclosure, a modular clip for a battery assembly is provided. The modular clip includes a housing configured to receive a plurality of battery cells. The housing includes a base portion, a first wall extending from the base portion along a length of the housing, and a second wall extending from the base portion along the length of the housing. The modular clip may be configured to form a channel that extends the length of the modular clip. The plurality of battery cells are received between the first wall and the second wall of the modular clip. The housing also includes a path for temperature control (referred to herein interchangeably as a "cooling path") formed by the first wall and/or the second wall. The cooling path extends along the length of the housing. The cooling path may comprise a gap maintained between the plurality of cells and the first and/or second wall. A first end of the housing may form an inlet for air to flow into the cooling path, and a second, opposite end of the housing may form an outlet for air to flow out from the cooling path.

In another aspect of the disclosure, a battery module is provided. The battery module includes a plurality of modular clips, each modular clip configured to receive a plurality of battery cells. Each modular clip may be configured to include a path for temperature control. The path for temperature control may comprise a gap maintained between the plurality of cells and the walls of the modular clip. The modular clip may be configured to form a channel that extends the length of the modular clip. The battery module may further include regulator plate extending along one end of each of the plurality of modular clips. The regulator plate may comprise multiple openings, where at least one of the multiple openings is configured to communicate air flow to the path for temperature control formed in each of the modular clips. The openings in the regulator plate may be shaped and/or sized to balance air flow to the paths for temperature control in the modular clips. The battery module may further include a duct that surrounds a side of the regulator plate opposite the modular clips to form a duct. The duct may direct air flow from the exterior of the battery module through the regulator plate and into the respective paths for temperature control of each of the modular clips.

In another aspect, a battery pack is provided, the battery pack comprising multiple battery modules, each battery module including a plurality of battery clips. Each modular clip may be configured to include a path for temperature control. The path for temperature control may comprise a gap maintained between the plurality of cells and the walls of the modular clip. The modular clip may be configured to form a channel that extends the length of the modular clip. Each battery module may further include a regulator plate extending along one end of each of the modular clips and a duct that surrounds a side of the regulator plate. The duct may direct air flow from the exterior of the battery module through the regulator plate and into the respective cooling paths of each of the modular clips.

Additional advantages and novel features of aspects of the present invention will be set forth in part in the description that follows, and in part will become more apparent to those skilled in the art upon examination of the following or upon learning by practice thereof.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

Several aspects of electric batteries, battery packs, battery modules, and modular sub-components of battery modules will now be presented with reference to various examples.

Figure 1:
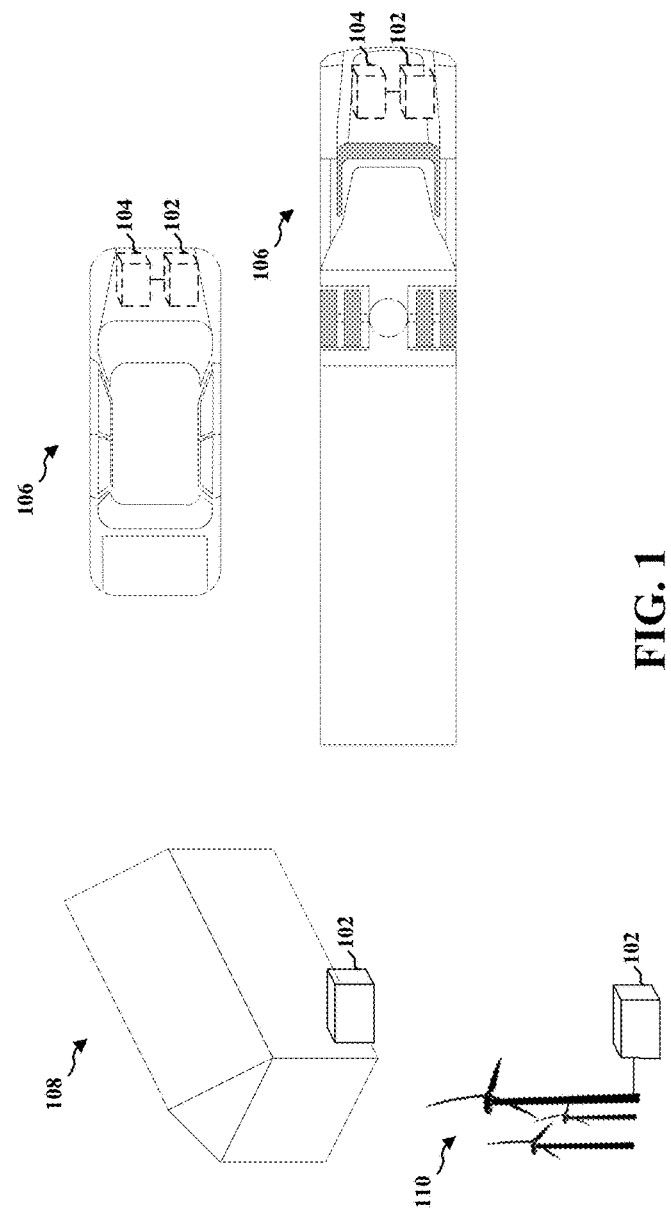
FIG. 1 illustrates example systems including an electric battery pack, in accordance with aspects presented herein.

FIG. 1 illustrates examples of systems that may include an electric battery pack 102 in accordance with the aspects presented herein. The battery pack may be comprised in an energy storage system for commercial and/or residential buildings 108. Energy storage systems may be used to store energy for utilities and/or to supply power to a residential or commercial building(s). Energy storage systems may be a component of a power plant or power generation system, e.g., for utilities. FIG. 1 illustrates a power generation system 110 having battery pack 102 as part of an energy storage system. While wind turbines are illustrated for the power generation system 110, solar and other forms of power generation are equally application.

The battery pack 102 may also be comprised within an electric vehicle and coupled to an electric motor 104 to drive the vehicle 106. As illustrated, the battery pack 102 may be used for different types of vehicles, including vehicles having internal combustion engines, including medium duty vehicles and heavy duty vehicles. The battery pack 102 may be part of a rechargeable battery system for the electric vehicle 106. The battery pack 102 may be coupled to an electric motor 104 that drives the vehicle and may provide a particular voltage/current to the electric vehicle. In one example, the electric vehicle 106 may comprise a fully electric vehicle driven entirely from stored electric power. In another example, the electric vehicle 106 may operate in a hybrid manner using both fuel combustion and stored electric power to operate the vehicle. In yet another example, the electric vehicle 106 may operate in various modes, e.g., a mode in which the vehicle relies on the battery pack for vehicle propulsion without a combustion engine, a hybrid mode in which the battery pack is used in combination with a combustion engine to drive the vehicle, and/or a combustion mode.

As described herein, battery packs and battery modules may be assembled in order to provide different voltages for different applications, e.g., for various vehicle types or for different battery storage applications. Aspects presented herein may be applied to batteries having varying sizes, voltages, and capacities.

FIG. 2A illustrates an example diagram of battery pack 102. The battery pack 102 may comprise multiple battery modules 210, each battery module 210 (also referred to interchangeably herein as a "module") comprising a plurality of modular battery clips 204, as described in connection with FIGS. 3-15. Although three battery modules 210 are illustrated in FIG. 2A, any number of battery modules may be included in the battery pack, e.g., according to the desired voltage, desired capacity, etc. of the battery pack. Similarly, while FIG. 2A illustrate an example battery module 210 comprising seven battery clips 204, each battery module may include any number of battery clips 204, e.g., according to the desired voltage, desired capacity, etc. of the battery module. Each battery module may comprise a controller board for a Battery Management System (BMS) 212. Each battery module 210 may comprise a slave BMS board (also referred to interchangeably herein as a "slave BMS board"), that may be coupled to a master BMS board 214 for the battery pack 102. The slave BMS board 212 of each battery module 210 may be directly connected to the master BMS board 216, as illustrated by connections 216. The BMS boards, whether master BMS board or slave BMS board may be referred to herein as a "controller board."

The battery pack may include electrical connections, e.g., a positive and negative connection. FIG. 2A illustrates connectors 220 and 230 for the battery pack 102, e.g., for coupling the battery pack with the electric motor 104 of a vehicle 106, an electrical system of a building 108, and/or power generation system 110. The battery pack may comprise a fuse 222, a current sensor 224, and a contactor 226 coupled via an input bus bar that connects to a first module 210. The order of components 222, 224, 226 may be changed, and additional sensors, such as temperature sensors, may be included in the battery pack. The battery modules 210 may be connected to each other, e.g., in series as illustrated in FIG. 2A or in parallel, as illustrated in FIG. 2B, depending on the desired voltage for the application. Thus, the number of battery modules and the manner in which the modules are connected to each other may vary depending on a desired voltage/capacity for the battery pack.

A last battery module 210 may be coupled to contactor 228 and electrical connection 230, e.g., via an output bus bar.

The battery pack may also include a disconnect component 232 positioned between each of the modules 210. For example, a mid-pack disconnect may be provided to selectively break the connection between battery modules 210. Among others, the disconnect component 232 may comprise a switch or a physical component that is removed from the battery pack in order to prevent a complete circuit. The disconnect component 232 provides a safety feature so that the battery pack 102 can be safely serviced. The battery pack may also comprise ducting components, e.g., duct 240, to provide air flow for each of the battery modules 210 in order to provide temperature control for the battery pack. The battery pack may also include a casing in which the components of the battery pack are positioned.

FIG. 2C illustrates example alternate connections between battery modules 210. In FIG. 2A, the modules are connected to each other in series. In the example in FIG. 2A, the voltage of the battery pack 102 will be equal to the sum of the voltage of the individual modules 210. In FIG. 2C, the modules 210 are connected in parallel via connections 234. The voltage of the battery pack 102 in FIG. 2C will be the voltage of a single module, because the modules are connected in parallel. However, the battery pack in FIG. 2C will have an increased capacity due to each of the modules 210. FIG. 2B also illustrates an alternate connection between the master BMS board 214 and the slave BMS boards 212. In FIG. 2A, the master BMS board 214 has a point-to-point connection with each individual slave BMS board 212. In FIG. 2B, a daisy chained connection may be used to couple the master BMS board to at least a subset of the slave BMS boards 212. As illustrated, the master BMS board 214 may have a direct connection to only a single (or a reduced number of) slave BMS boards 212, which may in turn have a connection 218 to at least one other slave BMS board 212.

Figure 2:
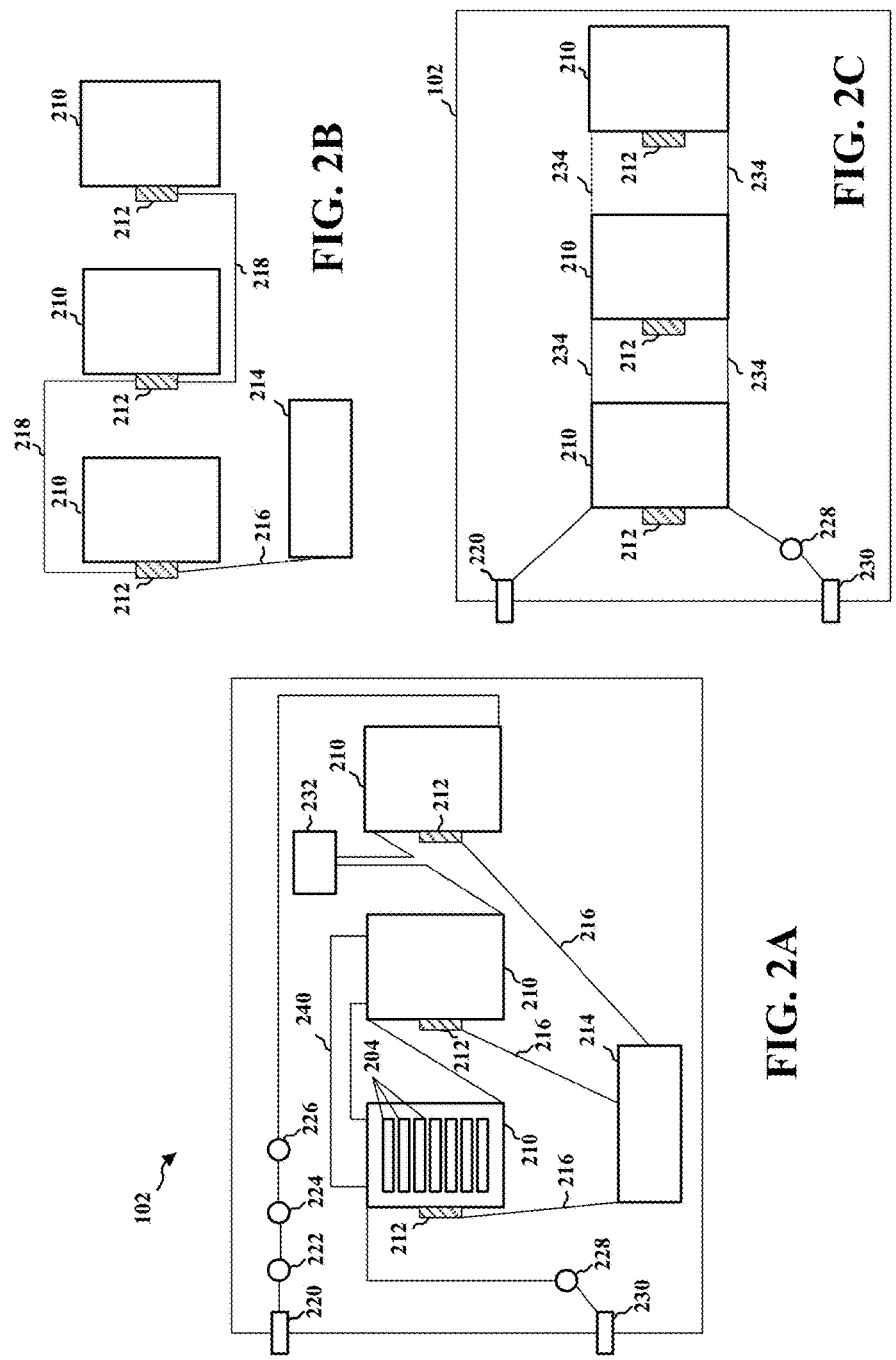
FIGS. 2A, 2B, and 2C illustrate example aspects of a battery pack, in accordance with aspects presented herein.
Figure 3:
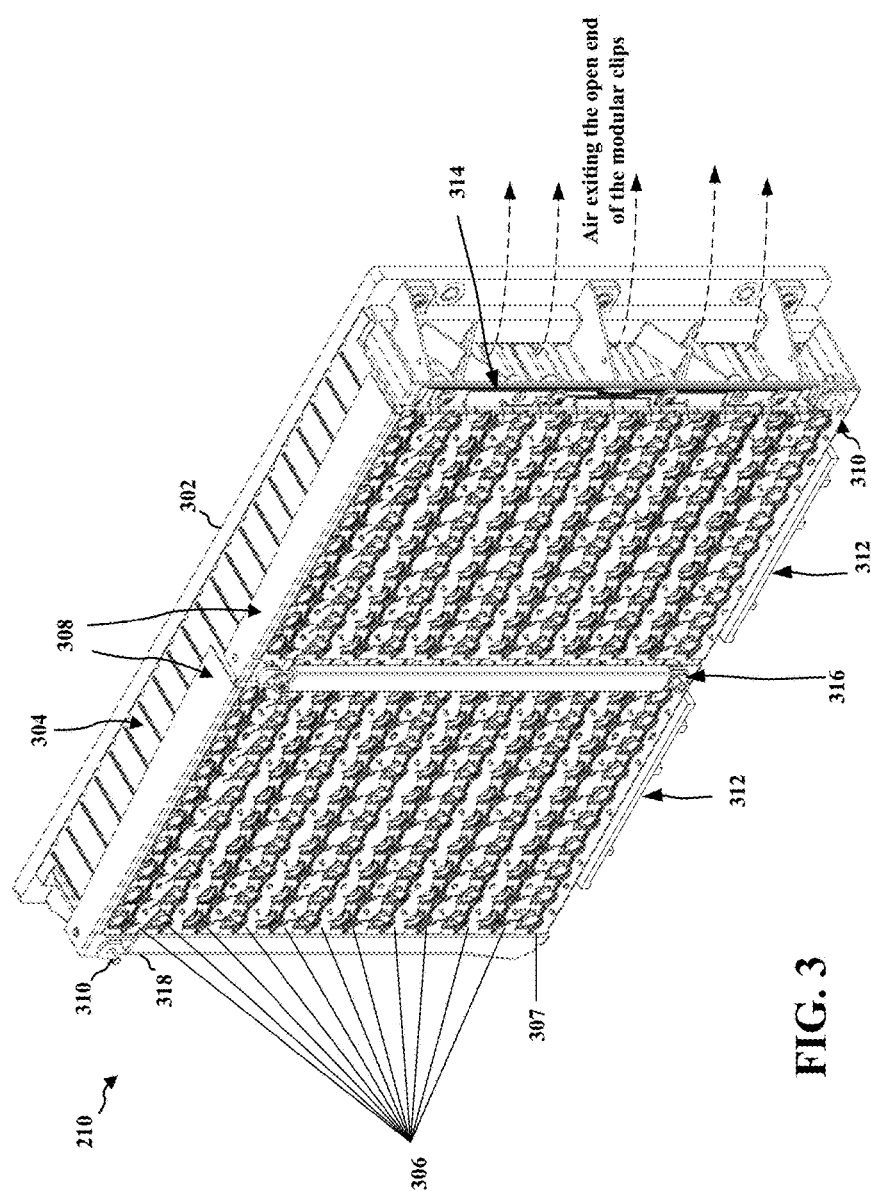
FIG. 3 illustrates an example battery module, in accordance with aspects presented herein.

FIG. 3 illustrates an example of a single battery module 210. The battery pack 102 in FIGS. 1 and 2 may include multiple such battery modules 210, as illustrated in FIG. 2. The battery module 210 comprises a base plate 302 and a plurality of modular clips 104, each modular clip configured to hold a plurality of battery cells. A side wall of a single modular clip 304 at an edge/side of the battery module 210 is visible in FIG. 3.

The base plate 302 may comprise a plastic, e.g., a polycarbonate or other plastic. The base plate may be injection molded using the plastic. However, the base plate may also be made with other materials and/other methods. For example, the base plate may comprise a metal such as aluminum or steel. The base plate may be machined or die cast rather than injection molded. The modular clip 304 may comprise a plastic, e.g., a polycarbonate or other plastic. The modular clip may be manufactured using injection molding. Depending on the application, the plastic for the base plate and/or modular clips may be selected to include an acceptable flame resistant rating. The plastic may further be selected based on the expected temperature range for a particular application.

A plurality of strips of electric interconnects 306 are provided at a top side of the battery module opposite the base 302. Interconnects 307 and 308 are also provided at the side of the module 210. The interconnects 306, 307, 308 may comprise a conductive material, such as copper. If portions of the base and/or clip are manufactured with a metal, it may be problematic for the base and/or the clip to come into contact with interconnects 306, 307, or 308. Thus, a non-conductive coating may be applied to any metal portions of a base and/or clip. The interconnects 306 may have a common configuration, whereas the side interconnects 307, 307 may comprise a different shape than the interconnects 306. Each interconnect 306 may partially overlap two, adjacent modular clips 304. The interconnects 306 may be shaped to allow for connections with battery cells on each side of the interconnect 306. A connection, such as a wire bond may be established between the interconnect and each of the plurality of cells on the two sides of the interconnect. Interconnects 307 and 308 may be provided at a side of the module 210, and may overlap only a single modular clip. Interconnects 307 and 308 may receive connections from cells in only a single modular clip, in contrast to interconnects 306. Connectors 310 provide a connection point for connecting or otherwise coupling the module 210 to other modules, e.g., in series or in parallel, and to the other components of the battery pack 102, as illustrated in FIGS. 2A and 2B.

The module 210 includes at least one PCB 314 and slave BMS board 312 (e.g., corresponding to slave BMS board 212 in FIG. 2). FIG. 2 illustrates an example in which the module may have a single slave BMS board 212. FIG. 3 illustrates an example in which the module may comprise two slave BMS boards 312. The number of BMS slave boards may be based on the capabilities of a particular slave board, e.g., the number of rows of cells in series that the slave BMS can monitor and control. The number of BMS slave boards may also be based on a number of cells connected in series. The slave BMS 212, 312 may be configured to read/monitor a voltage of each bank of battery cells and to balance the voltage. The slave BMS may also be configured to read other sensor readings such as temperature readings at temperature sensors positioned at a subset of battery cells. A BMS master 214 may control the BMS slave boards 212, 312 and controls discharging/charging of battery modules 210. In addition to the slave BMS board 312, the module 210 may further comprise at least one Printed Circuit Board (PCB) 314, e.g., a voltage sensing PCB. The PCB 314 may be connected to each interconnect in order to measure voltages between groups of cells. The PCB 314 may also be connected to the slave BMS.

Figure 4:
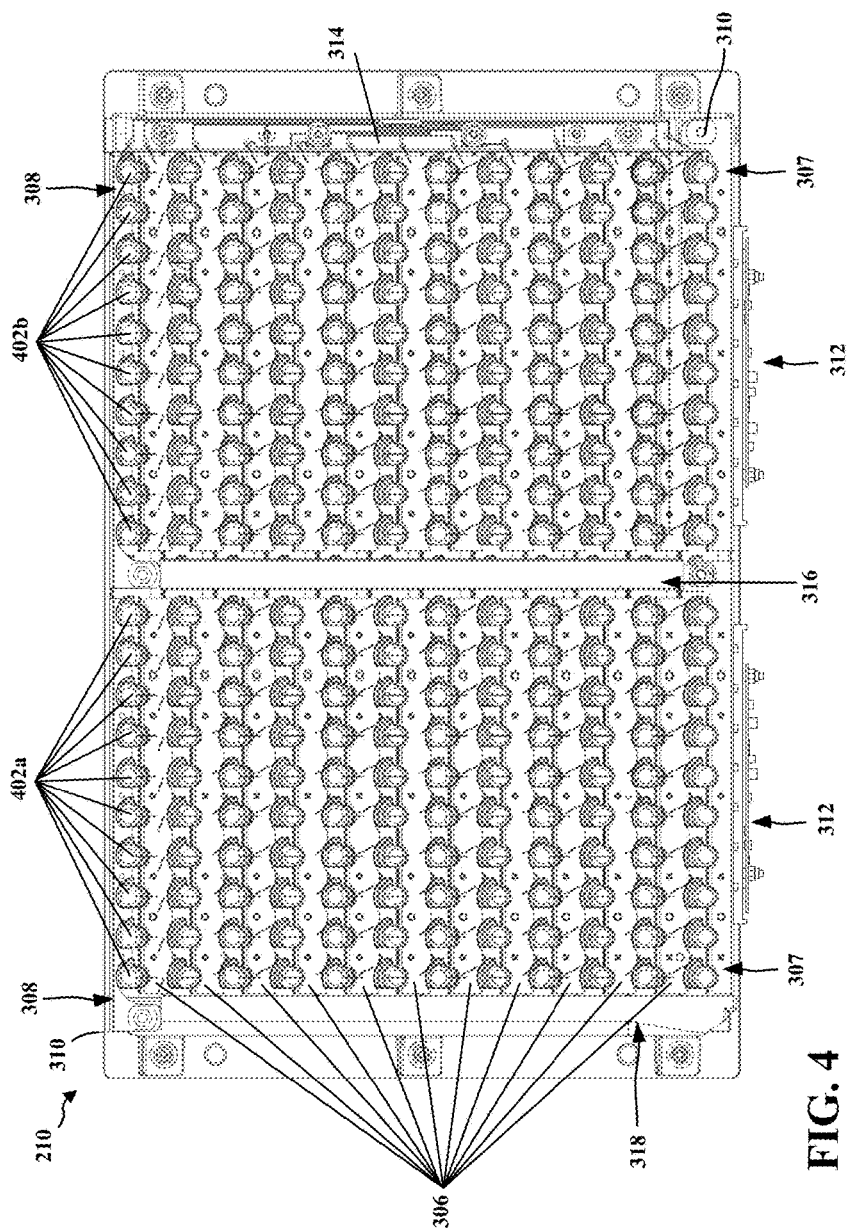
FIG. 4 illustrates a top view of an example battery module, in accordance with aspects presented herein.

FIG. 3 illustrates an example module 210 having 12 rows of modular clips, where each modular clip is able to receive 21 battery cells. In FIG. 3, the module has been configured as two electrical modules on different sides of the bus bar 316. On each half of the module, the 12 rows of modular clips each receive 10 battery cells. Thus, the two electrical groupings of the module 210 form a 12s10p array, with the overall module providing a 24s10p grouping. In another example, the module may not have a bus bar, and the interconnects 306, 307, 308 may extend across a full length of the module rather than half of the length, as illustrated in FIGS. 3 and 4. Such a configuration would lead to groupings of 21 battery cells connected in parallel, and 12 rows connected in series, e.g., a 12s21p grouping. The cells connected in parallel will be charged/discharged together. This configuration would provide half of the voltage of the two electrical modules of FIGS. 3 and 4, and would provide double the capacity.

The number of rows of modular clips and the number of battery cells that a particular modular clip is able to receive in FIG. 3 are merely non-limiting examples. Any number of rows of modular clips may be included in a battery module. For example, a module may comprise between 2-50 modular clips, e.g. between 2-24 modular clips. The design can also be extended beyond 50 modular clips per battery module. The number of modular clips in each module may be determined based on any of a number of factors, e.g., any combination of size limitations, weight limitations, assembly needs, voltage requirements, capacity requirements, etc. For example, a battery pack for energy storage does not have the same size and weight limitations as an electric vehicle and may comprise a higher number of modular clips in a single battery module. Similarly, the number of cells that a modular clip is configured to receive may vary. A modular clip may be configured to receive 2 or more battery cells. A range based on typical size and weight restrictions may comprise between 2-50 battery cells, for example. However, the configuration itself does not place a limit on the number of battery cells or the number of modular clips combined in a single battery module 210. Similar to the basis for the number of modular clips 304 in a module 210, the number of cells 402 within a modular clip 304 may be selected based on any of a number of factors, e.g., any combination of size limitations, weight limitations, assembly needs, voltage requirements, capacity requirements, etc.

FIGS. 3 and 4 illustrate an example in which the module 210 may be configured to include multiple electrical modules, the different electrical modules sharing the same set of modular clips yet being separated by bus bar 316. In this example, the bus bar is positioned across the modular clips at a central position. While the clips physically form unitary rows, the electrical connections formed by the set of interconnects 402*a*, 402*b* may form two electrically separate modules. For example, the interconnects 306, 307, 308 extend only to the bus bar 316. Then, a separate set of interconnects are provided on the other side.

The configuration of the module as two separate electrical module enables the module to achieve a voltage double that of a single electrical module, because the configuration doubles the number of groups of battery cells that are coupled in series. Each electrical module may comprise a connection to a separate PCB.

If a higher voltage is desired, additional bus bars beyond bus bar 316 may be provided to further group the cells into electrically separate modules. Thus, a single bus bar 316 at a center cell position of the modular clips, as illustrated in example FIGS. 3 and 4 is merely one example of the use of a bus bar to separate the module 210 into electrically separate modules.

FIG. 4 illustrates a top view of the battery module 210. As illustrated in FIG. 4, ten battery cells 402*a*, 402*b* may be positioned in a modular clip on each side of the bus bar 316. A singular modular clip may receive and hold each of battery cells 402*a* and 402*b*. However, the cells in the singular modular clip may be grouped into the two electrical groups based on the use of separate interconnects 306, 307, 308 on different sides of the bus bar 316.

As described in connection with FIGS. 14-16, a duct 318 may be provided at a side of the module to provide temperature control for the battery cells. Air may be directed from the duct through the modular clips 304. As illustrated in FIG. 3 with a dashed line, the air may exit the modular clips at the side opposite the duct 318. The side opposite the duct may be substantially open to allow the air to freely flow through channels formed by the modular clips and out of the battery module 210. A side of the battery module opposite the inlet duct 318 may include an outlet duct, e.g., for the purposes of collecting and directing the outlet air. For example, the outlet air could also be circulated through additional modules. FIG. 2 illustrates an example duct 240 communicating outlet air from one battery module 210 to an inlet duct of another battery module 210.

Figure 5:
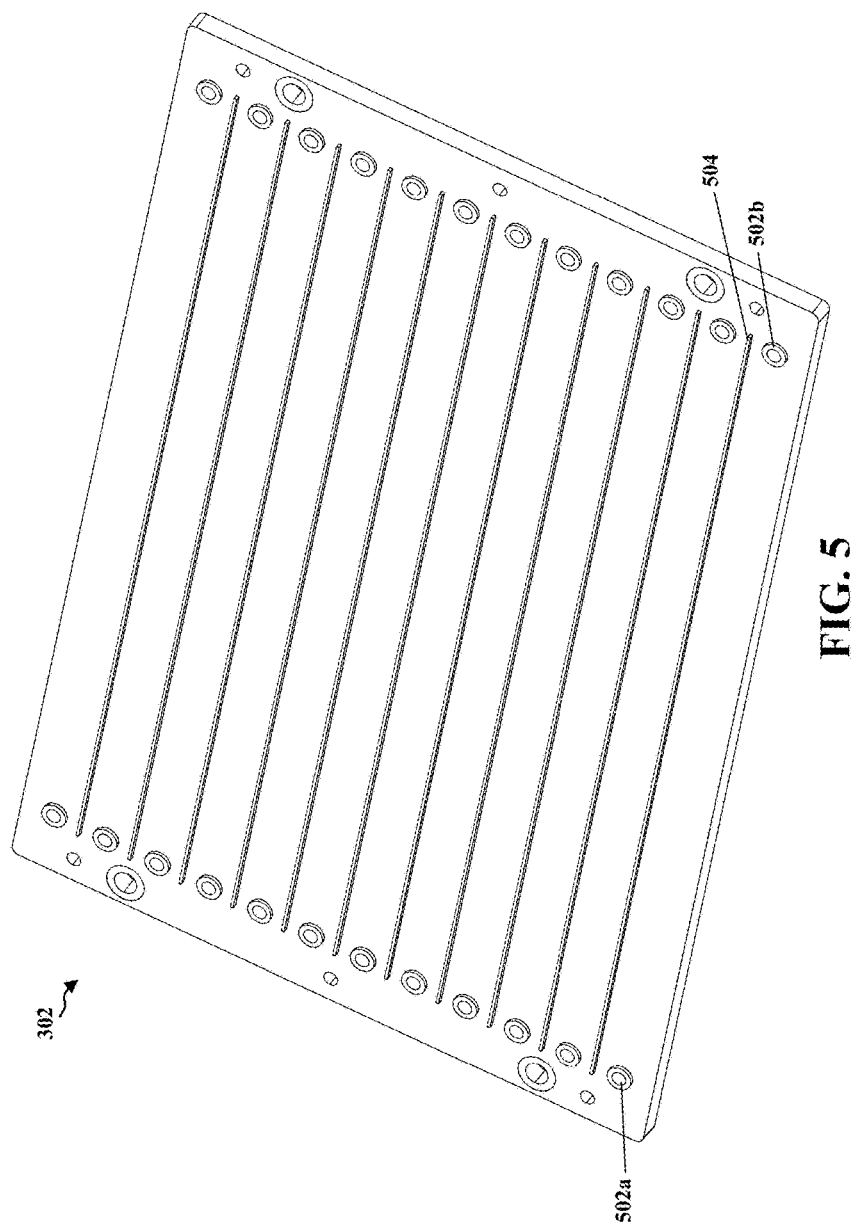
FIG. 5 illustrates a base plate of an example battery module, in accordance with aspects presented herein.

FIG. 5 illustrates an example base plate 302 to which multiple modular clips 210 may be mounted to form a battery module 210. The base plate may include openings to receive at least one fastener to hold each of the module clips to the base plate. For example, opening 502*a* may receive a fastener at one side of a modular clip, and opening 502*b* may receive a fastener at the opposite side of the modular clip. The base plate may also include a positioning feature that assists in positioning the modular clips on the base plate. For example, the base plate may comprise at least one raised portion, e.g., a button, for positioning the modular clips. The modular clip may comprise a corresponding indent shaped to match the raised portion. The raised portion and matching indent assist the modular clips in being positioned with the correct spacing. FIG. 5 illustrates an example in which the raised portions may surround the openings 502*a*, 502*b* that receive the fastener to couple the modular clips 304 to the base plate 302. The base plate may also comprise a raised portion 504 that runs parallel to the modular clip.

Figure 6:
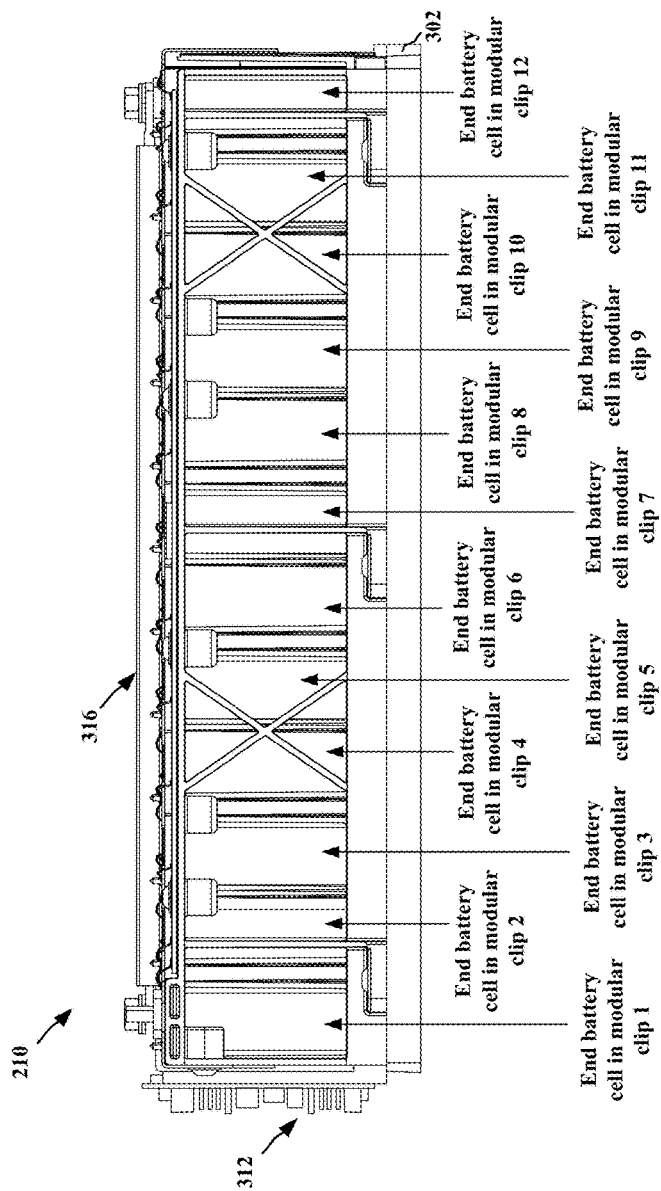
FIG. 6 illustrates a side view of an example battery module, in accordance with aspects presented herein.

FIG. 6 illustrates a side of battery module 210 opposite the duct 318. This open side of the battery module 210 is the side through which the air exits the cooling paths formed by the modular clips. The side of the module 210 visible in FIG. 6 is substantially open to allow air flow to freely exit from the path or channel formed by each modular clip. A single battery cell 402 in each of the 12 rows of modular clips is visible in FIG. 6.

Figure 7:
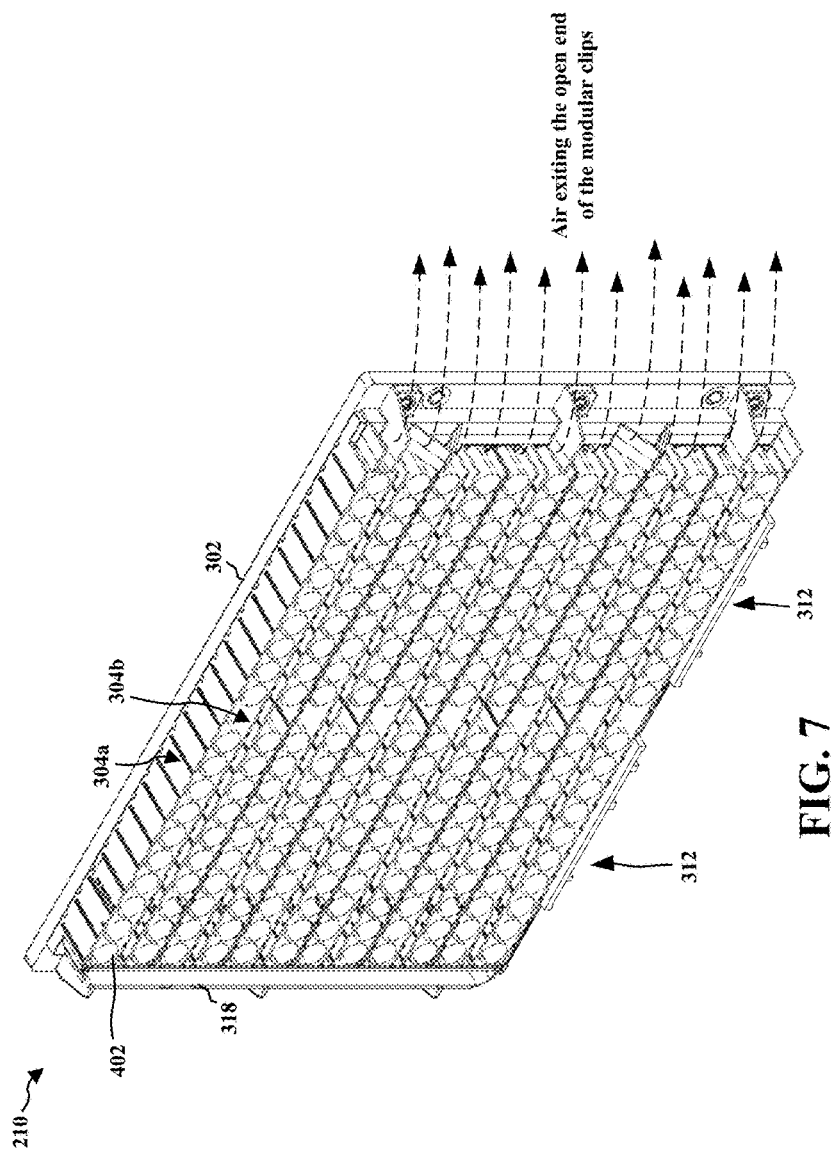
FIG. 7 illustrates a view of an example battery module having interconnects and retainer plates removed, in accordance with aspects presented herein.
Figure 8:
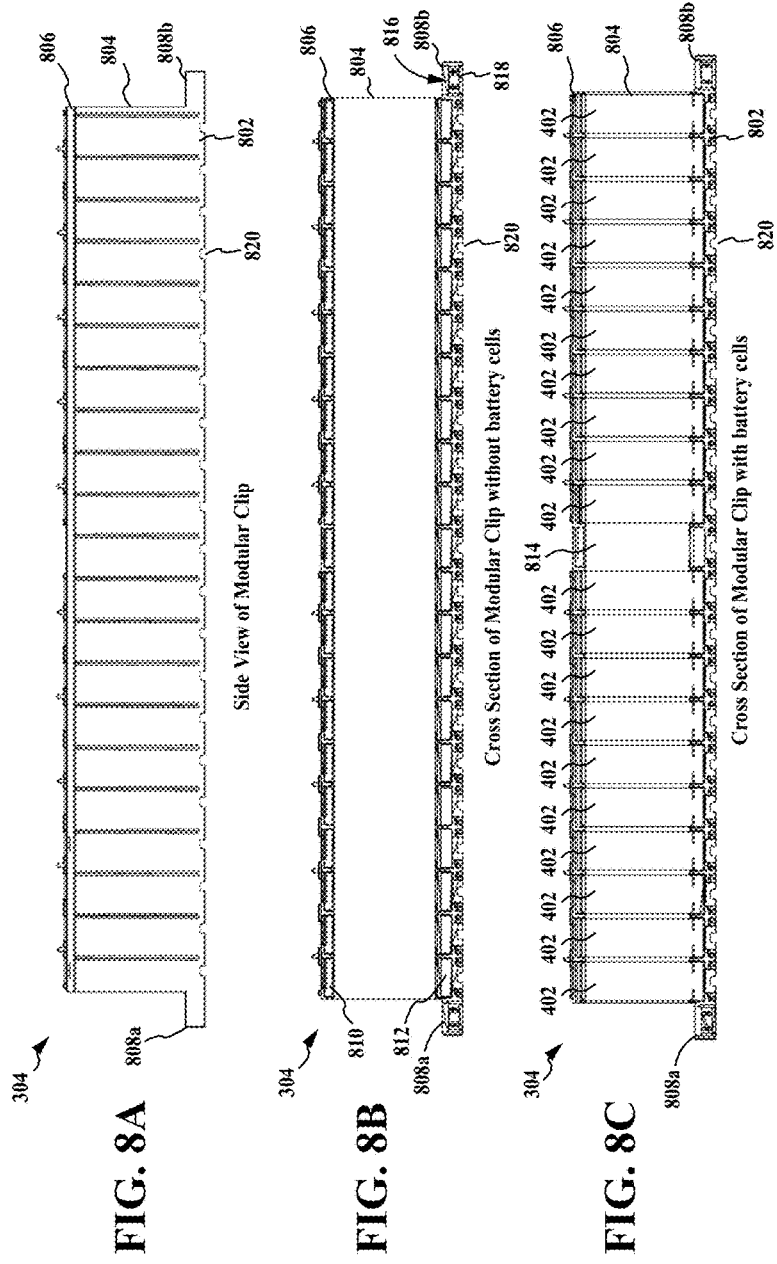
FIGS. 8A, 8B, and 8C illustrate a side view, and cross sections of a side of a modular clip, in accordance with aspects presented herein.

FIG. 7 illustrates a view of the module 210 similar to FIG. 3, however, having interconnects 306, 307, 308 and retainer plate 806 removed so that the linear rows of cells 402 in each modular clip are visible. The modular clips each comprise two walls 304*a* and 304*b* that extend the length of the modular clip. The battery cells 402 are received into the modular clip and positioned between the two walls, e.g., in a linear row. In FIG. 7, the central cell position in each modular clip is empty and does not include a battery cell. The bus bar may be positioned at this central location, for example.

FIG. 8A illustrates a side view of a single modular clip 304. FIGS. 8A, 8B, 8C, 9 and 10 illustrate an example of a modular clip 304 for assembly in a battery module 210. The modular clip 304 includes a housing configured to receive a plurality of battery cells 402. FIG. 8B illustrates a cross section of the modular clip prior to insertion of battery cells 402, and FIG. 8C illustrates a cross section of the modular clip having battery cells 402 inserted into the housing. FIG. 8C illustrates a position 814 at which no battery cell has been inserted. This may be the position of the bus bar 316, for example.

The housing of the modular clip 304 may include a base portion 802. The base portion 802 may comprise a plurality of bottom cell recesses 812 configured to surround a portion of each of the battery cells 402. FIGS. 8B and 8C illustrate the bottom cell recess 812 formed as an indent in the base portion 802 and having a shape corresponding to the exterior of the battery cell 402. In FIGS. 8B and 8C, the bottom cell recess 812 comprises a circular/cylindrical indent. However, for battery cells of different shapes, e.g., prismatic, hexagonal, triangular, square, etc., the indent may be similarly formed with a corresponding shape to receive the battery cell.

The housing of the modular clip 304 includes a first wall 804*a* and second wall 804*b* extending from the base portion 802. FIG. 8A illustrates a side view of one wall 804. The plurality of battery cells 402 are received in the housing between the first wall 804*a* and the second wall 804*b*.

The modular clip 304 may also comprise a top portion 806, referred to interchangeably herein as a "top retainer plate." The base portion 802 and walls 804a, 804b may be formed as a unitary piece, and the top retainer plate 806 may be configured as a separate piece of the modular clip 304 that is attached after the cells 402 are inserted into the modular clip. In other examples, the base portion 802 and the walls 804a, 804b may comprise separate components that are coupled together along with the top retainer plate to form the modular clip. The top retainer plate 806 may comprise upper/top cell recesses 810, shaped to surround a portion of the exterior of the battery cell. The plurality of top cell recesses 810 may be aligned corresponding to an alignment of the plurality of bottom cell recesses 812 in the base portion, which may also be referred to as a "bottom cell retainer." Thus, a pair of a top cell recess 810 and bottom cell recess 812 may jointly surround portions of a battery cell at each end of the cell, e.g., at the top and bottom of the battery cell. The cell recesses provide mechanical support to the cells in the event of a shock to the battery pack and controls the spacing between battery cells in the modular clip. Thus, within a modular clip, the battery cells may be positioned at a set spacing from adjacent cells. Cell spacing may be selected to meet passive propagation resistant (PPR) needs for the particular cell and wall spacing of the modular clip. The spacing may be determined empirically based on the configuration of the modular clip, the particular battery cells, the chemistry of the battery cells, the specification of the battery cells, the charge capacity of each cell, etc. In one example, the gap between battery cells within the row of a single modular clip may be greater than approximately 2 mm. The top and bottom cell recesses may enable the battery cells to be slip fit into the modular clip. The bottom cell recess may have a depth in the range of approximately 3 mm to approximately 20 mm, or a depth of up to ⅓ the height of a battery cell. The top retainer plate 806 may comprise an opening corresponding to each of the plurality of cells. The opening may be configured to enable a connection to be made to the upper portion of the cell and the interconnects 306, 307, or 308.

FIGS. 8A, 8B and 8C also illustrate extending portions 808a, 808b that may extend from each side of the modular clip 304. The extension portions 808a, 808b may comprise openings 816 configured to align with the openings 502a, 502b in the base plate. A fastener may be inserted through the openings 808a, 808b, 502a, 502b and fastened in order to couple the modular clip 304 to the base plate 302. Openings 808a, 808b may each comprise a compression limiter 818 that is configured to prevent the extending portion 808a, 808b from being crushed when the modular clip is fastened to the base plate 302. The compression limiter may comprise a different material than the modular clip. For example, the modular clip may comprise a plastic, and the limiter may comprise a metal. For example, the compression limiter may comprise a metal ring positioned inside the opening 808a, 808b. The fastener may comprise a threaded fastener, such as a screw. The modular clips may also be fastened to the base plate using other fastening mechanisms, e.g., including a tab attachment piece at the modular clip, an adhesive, a heat pin, etc. FIGS. 8A-C also illustrate a plurality of channels 820 configured in the base portion 802.

The bottom cell recesses 812 may each comprise an opening around a bottom vent of the battery cell 402. Channels 820, formed either in the clip or in the base plate, may communicate with the opening to enable the battery cell to vent to the exterior of the battery module when a rupture occurs. FIG. 12A illustrates a cross section of the opening 1202 and channel 820.

Figure 9:
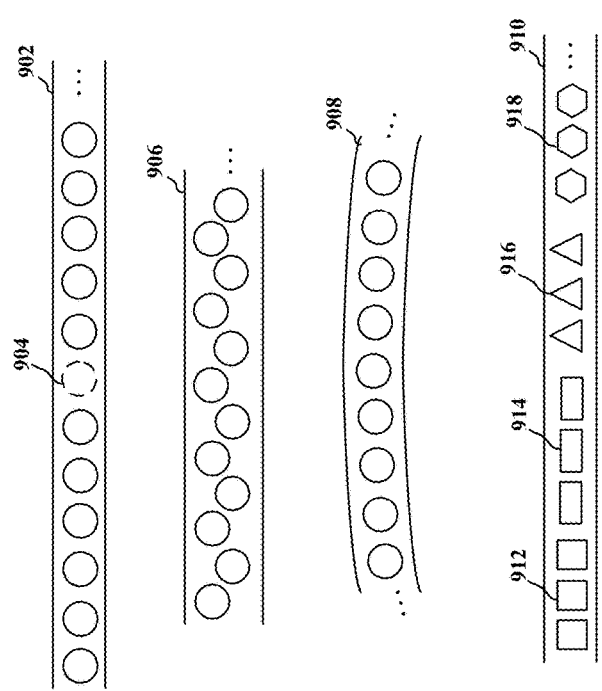
FIG. 9 illustrates example modular clips, in accordance with aspects presented herein.

Various types of battery cells 402 may be used in connection with the aspects presented herein. The battery cell may comprise a lithium-ion battery cell. Other examples of the chemistry of the battery cell may comprise nickel-metal hydride, lead-acid, lithium iron-phosphate, lithium titanate, etc. While cylindrical battery cells are illustrated in FIG. 7, the battery cells may comprise a prismatic cell, cylindrical cell, or other geometries. FIG. 9 illustrates a modular clip 910 having different examples of prismatic batteries, e.g., having a square cross-section 912, a rectangular cross-section 914, a triangular cross section 916, and a hexagonal cross-section 918. The cell recesses in the modular clips may be shaped according to the exterior shape of selected battery cell. Similarly, the aspects presented herein may be configured for use with battery cells of various sizes. One example of a cylindrical battery cell may be a 10 mm diameter and a 70 mm length. Other shapes/sizes of battery cells are equally applicable to use in the modular clip design presented herein. For example, another size battery cell may comprise a 18 mm diameter and 65.6 mm length, etc. The modular clip may be scaled to the size of any particular battery cell. For example, the top and bottom recesses of the modular clip may be sized and shaped to receive any size/shape of a particular battery cell.

The modular clips in FIGS. 3-8C are illustrated as having linear walls 804a, 804b to form straight rows of battery cells. The modular clips are also illustrated as only having a single row of battery cells. FIG. 9 illustrates an example modular clip 902 configuration having a single linear row of cells of any number. At least one cell position 904 may be left unoccupied. This may be for a bus bar position to create different electrical units for the cells within a modular clip or for other uses. Modular clip 906 illustrates an example modular clip being configured to receive two staggered rows of battery cells. Additionally, the modular clips may be nonlinear. For example, the walls of the modular clip may have a curved, rounded, arced, or other customized shape. Modular clip 908 illustrates an example modular clip having curved walls. Thus, the modular clip, battery modules, and battery pack described herein may be shaped to fit to a customized position in a vehicle or other structure.

Configuration for Temperature Control

The present application describes a modular configuration that provides increased manufacturing efficiency, improved electrical connections, increased ease for repair and service, and that also provides temperature control/regulation through air flow. Air flow for temperature control may be directed, at least in part, by the shape of a modular clip 304. Each modular clip 304 includes a cooling path, e.g., a gap, channel, or opening, that extends along the length of the modular clip past each of the cell holders that receive battery cells. While the path is referred to herein as a "cooling path," the path comprises a path for temperature regulation/control whether cooling battery cells to avoid overheating or warming battery cells in a cold environment to maintain an optimal operating temperature. There is no limitation that the path be used to cool rather than warm or otherwise maintain an optimal temperature of a battery module. The cooling path may comprise a gap 1102 or channel between a wall of the modular clip 304 and the battery cells. Thus, when battery cells 402 are inserted into the cell holders, e.g., bottom recesses 812, the cooling path 1102, 1102a, 1102b directs air to flow through the length of the clip 304, flowing past and around the battery cells 402. This air flow through the clips 304 controls the temperature of the battery cells 402 without requiring additional components such as a cold plate.

Figure 10:
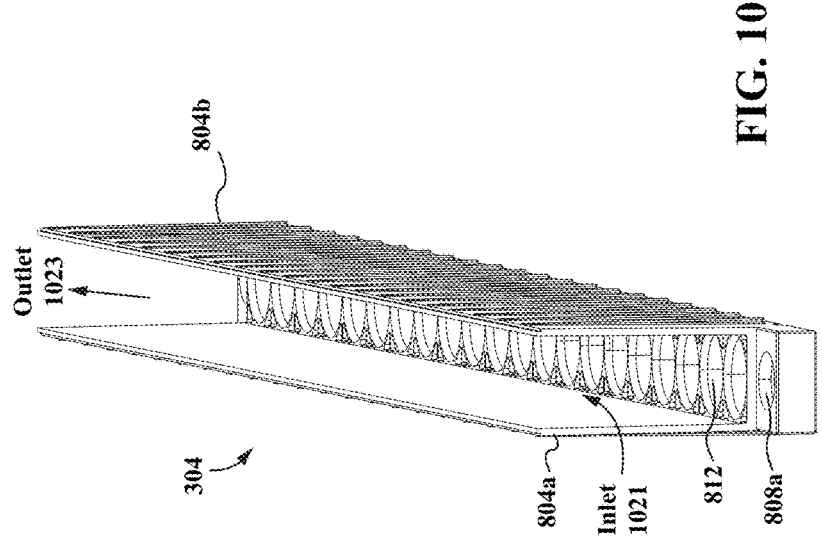
FIG. 10 illustrates a perspective view of an example modular clip shell, in accordance with aspects presented herein.
Figure 11:
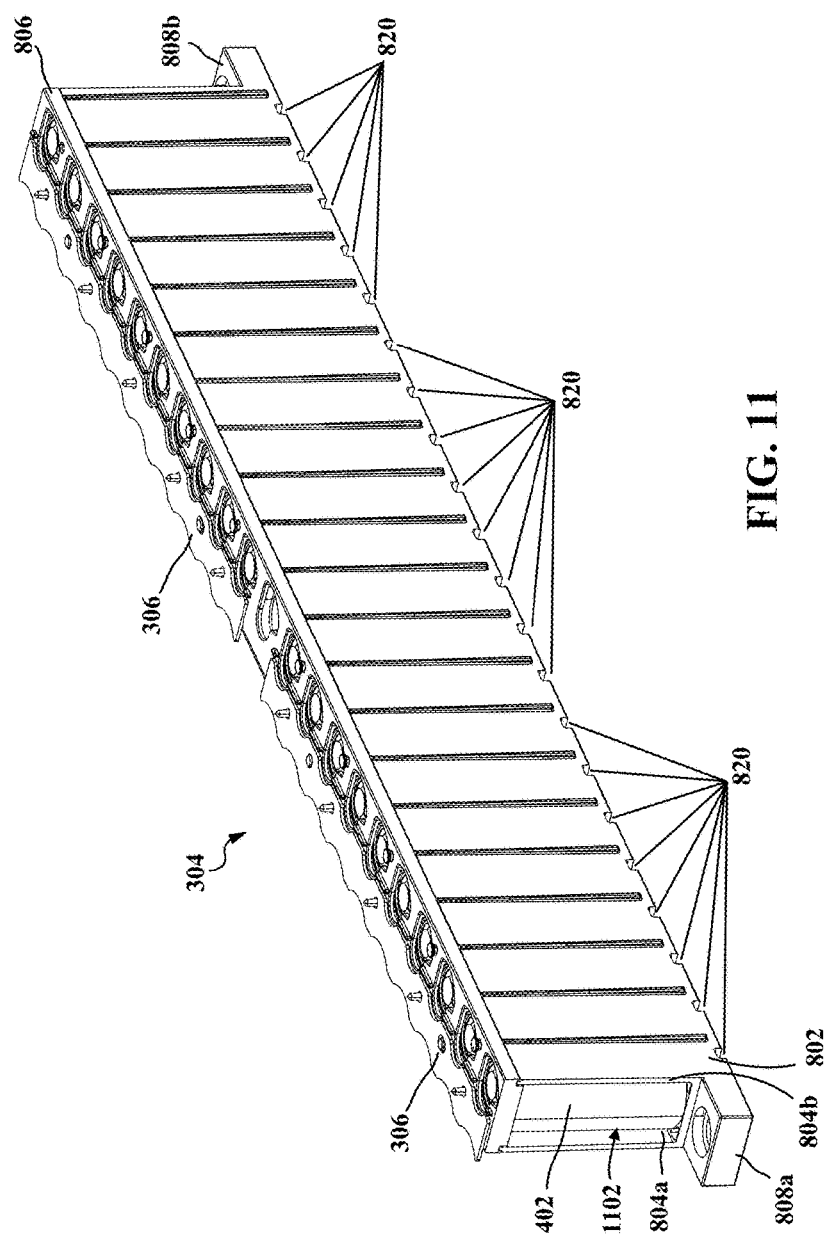
FIG. 11 illustrates a perspective view of an example assembled modular clip, in accordance with aspects presented herein.
Figure 12:
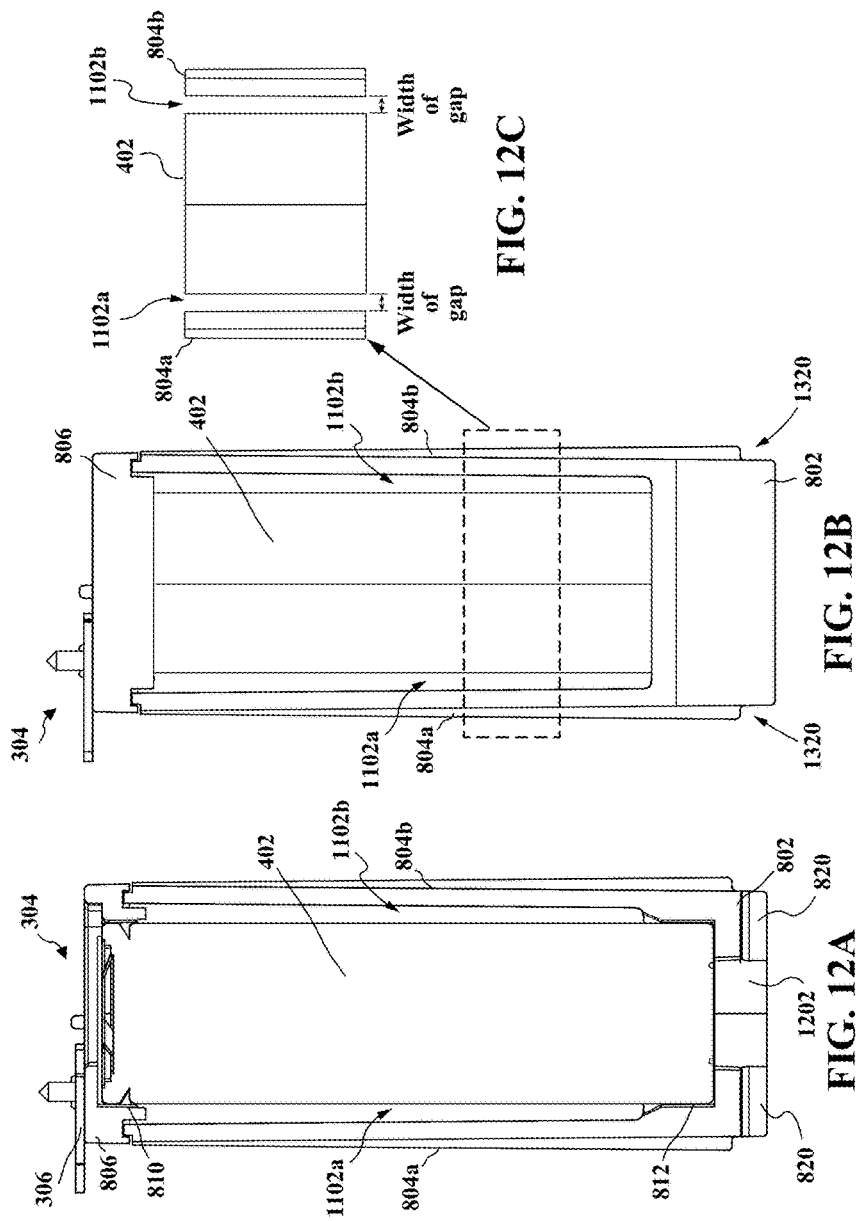
FIG. 12A illustrates a cross section of an example modular clip, in accordance with aspects presented herein.
FIG. 12B illustrates an end view of an example modular clip.
FIG. 12C illustrates a close up view of a portion of the modular clip in FIG. 12B.

FIG. 10 illustrates a perspective view of a bottom portion of a modular clip, e.g., including base portion 802 and walls 804a, 804b. This portion of the modular clip may also be referred to as the clip "shell." FIG. 10 illustrates that the base portion and walls form a channel through which air may be directed to cool or otherwise regulate the temperature of the battery cells received into the cell recesses 812 of the clip 304. FIG. 11 illustrates a perspective view of a modular clip 304 comprising the top retainer plate 806, battery cells 402, and an electrical interconnect 306. FIG. 11 illustrates a gap 1102 formed between a cell 402 and wall 804a of the modular clip 304.

Figure 13:
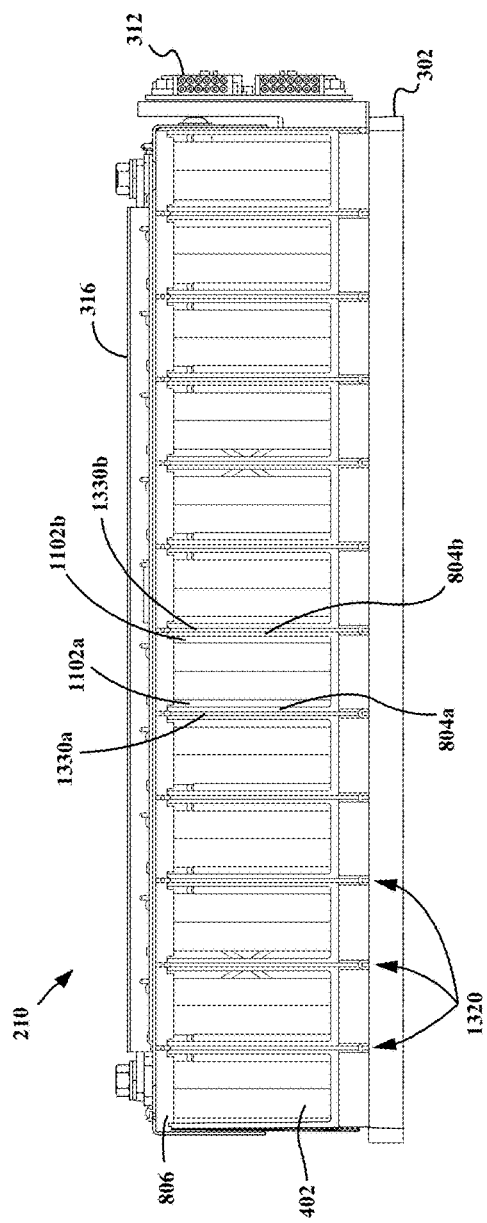
FIG. 13 illustrates a side view of an example battery module, in accordance with aspects presented herein.

FIG. 12A illustrates a cross section of a modular clip 304 holding a battery cell 402. A gap 1102a, 1102b is formed between the battery cell 402 and the walls 804a, 804b of the modular clip. FIG. 12B illustrates an end view of the modular clip 304 and shows that the gaps 1102a, 1102b extend the length of the modular clip. FIG. 12C illustrates a closer view of the gap 1102a, 1102b between the walls 804a, 804b and the battery cell 402. FIG. 12C illustrates an example width of the gaps 1102a, 1102b. The gaps 1102a, 1102b form cooling paths that extend the length of the modular clip. FIG. 13 illustrates a side view of a module 210 showing an end view of each of the modular clips in the module. FIG. 13 illustrates the gaps 1102a, 1102b located between the battery cells and the walls 1330a, 1330b of each of the modular clips 304.

The size of the gap 1102a, 1102b may vary. For example, a smaller gap may be used when higher air pressure is directed through the cooling path. A smaller gap 1102a, 1102b may also be used if a spacing is increased between cells within a modular clip 304. The gap 1102a, 1102b may be between approximately 0.1 mm-5 mm depending on the amount of temperature regulation that is needed for a particular battery module.

As illustrated in FIG. 10, a first end 1021 of the modular clip forms an inlet for air flow into the cooling path 902a, 902b and a second end 1023 of the modular clip, opposite the first end, forms an outlet for air flow exiting from the cooling path. Thus, the cooling path allows air to flow into one end of a channel formed by the modular clip and out the opposite end of the channel formed by the modular clip. The air flowing through the cooling path cools the battery cells and enables the battery cells to maintain a desired temperature for the battery, e.g., while the battery is in use.

Thus, the modular clip shell may comprise two portions. A first portion may include the base portion 802 that fits around the battery cell 402 and helps to secure the battery cell in its position within the modular clip 304. The second portion may be formed by the walls 804a, 804b of the housing that are spaced from the exterior of the battery cells 402. The modular clip may be formed to receive the plurality of cells in a row.

As illustrated in FIG. 10, the base portion 802 may be configured to receive a small percentage of the battery cell height. The majority of the exterior of the battery cell may be surrounded by the cooling path/gap between the walls 804a, 804b of the modular clip rather than being received in the bottom recess 812 or the top recess 810. For example, the base portion 802 or bottom recess 812 may comprise a depth of less than ⅓ of the battery cell height. The cooling path may comprise a height of up to ⅔ of the battery cell height. The cooling path may comprise a depth of at least ¼ a height of the battery cell, in one example. In addition to the clip shell, the modular clips 304 may also comprise a retainer plate 806. Thus, the cooling path formed in each of the modular clips may be formed along the length of the housing of the clip from the inlet 1021 to the outlet 1023 in the gap 1102a, 1102b that extends between the base portion 802 and the retainer plate 806 of the modular clip 304. The air flow channels of the modular clips assists the air to flow evenly past each of the battery cells in the channel. Thus, each cell receives a substantially even amount of air exposure. The arrangement of the modular clip 304 leads to a number of benefits, e.g., including even air flow cooling, improved electrical connections, and manufacturing efficiency through modular design.

As illustrated in FIGS. 3, 4, and 7, a modular clip having the described cooling path may be a sub-component of a battery module 210, which may be a sub-component of a battery pack 102. The battery module 210 may comprise multiple modular clips 304, each being coupled to a single base plate 302.

Figure 14:
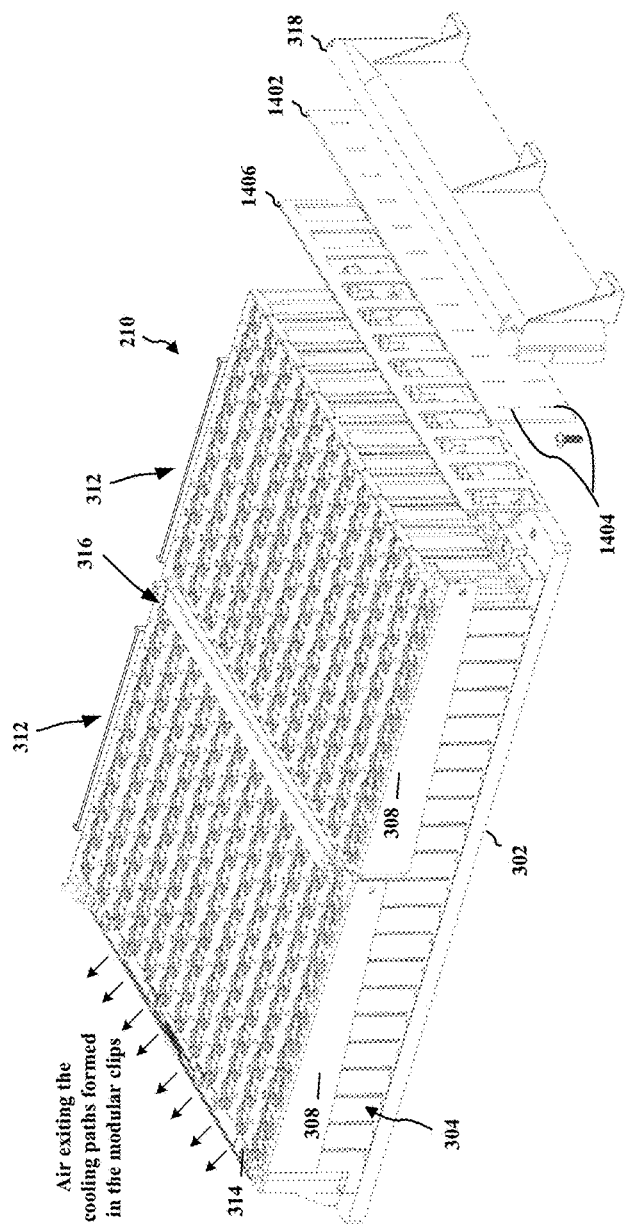
FIG. 14 illustrates an exploded view of an example battery module, in accordance with aspects presented herein.

The module 210 may further comprise a regulator 1402 configured to regulate/control the air flow into each of the inlet ends of the modular air clips, as illustrated in the exploded view of FIG. 14. The regulator 1402 may comprise a plate that extends along a side of the module such that the regulator extends across an end (e.g., which may be referred to as an inlet end, e.g., 1021) of each of the modular clips.

Figure 15:
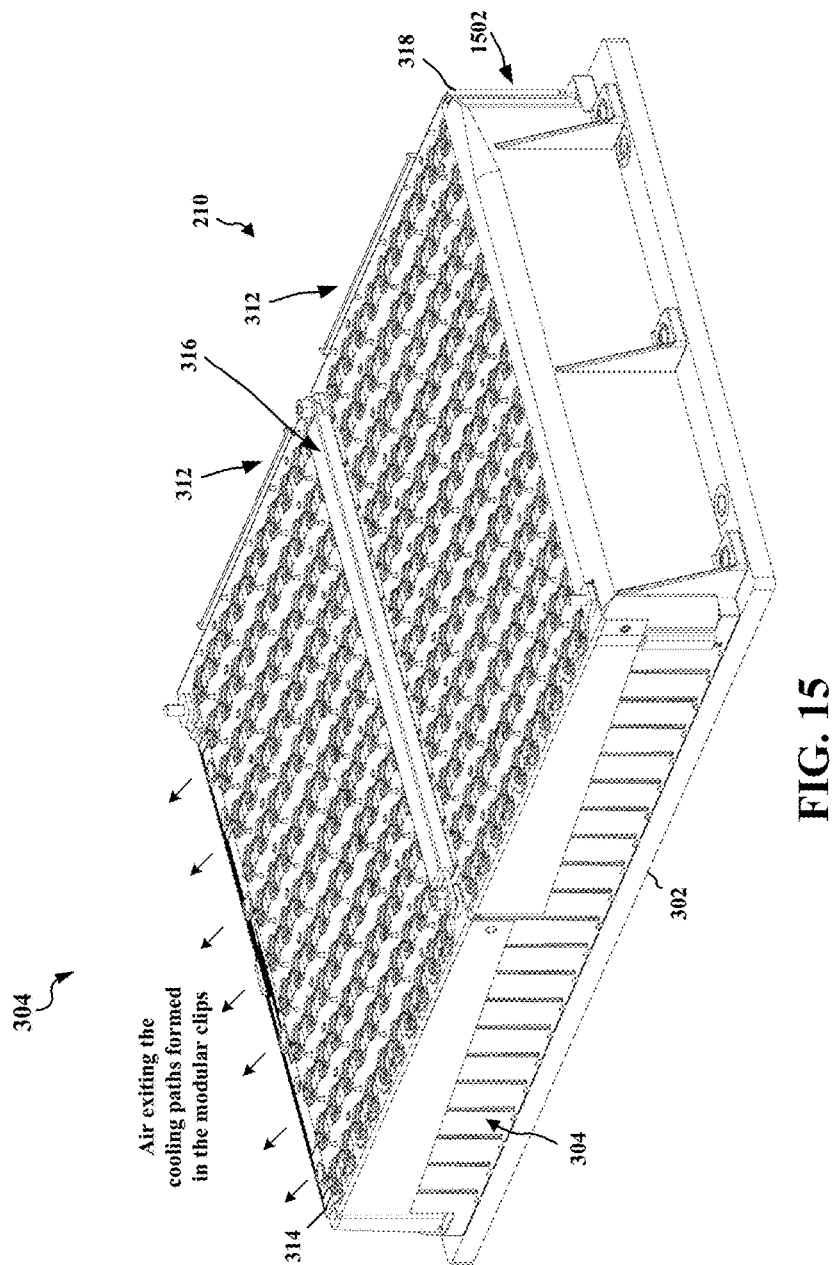
FIG. 15 illustrates a perspective view of an example battery module, in accordance with aspects presented herein.
Figure 16:
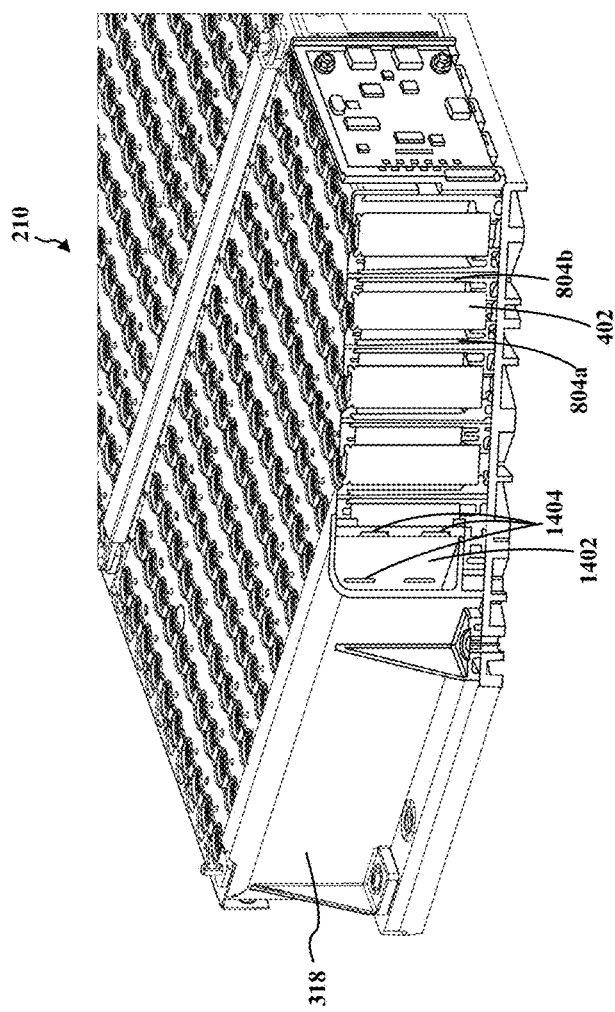
FIG. 16 illustrates a cut away view of an example battery module, in accordance with aspects presented herein.

FIGS. 14-16 illustrate example views of a battery module from a side having a duct 318. FIG. 16 illustrates a cut-away view showing the interior of the duct 318. As illustrated in FIG. 14, the regulator plate 1402 may include multiple openings 1404, at least one opening corresponding to each inlet end of each of the modular clips 304. The openings 1404 in the regulator plate 1402 may be spaced to align with the inlet end 1021 of each of the modular clips. The openings 1404 in the regulator plate 1402 may be configured to align at least partially with the cooling path of each of the modular clips. FIG. 14 illustrates two openings 1404 communicating air flow from the duct 318 to the cooling path. This is merely one example. A single opening 1404 may be provided for each modular clip 304 and/or more than two openings may be provided in the regulator plate 1402 for each modular clip 304. An adhesive 1406 may be applied between the regulator 1402 and the inlet ends of the modular clips 304.

The side of the battery assembly opposite the regulator plate 1402 may comprise a substantially open area, e.g., outlet 1023, that enables the cooling path in the clips to communicate air flow directly with the exterior of the battery assembly, e.g., as illustrated in FIGS. 3 and 6. Thus, air blown into the inlet end 1021 of the modular clips through the regulator plate 1402 may exit freely out the outlet end 1023 of each of the modular clips 304.

In addition to the regulator plate 1402, the battery assembly may further comprise an additional duct piece 318 that surrounds a side of the regulator plate opposite the modular clips to form a duct that introduces air into the cooling path of the modular clips. The duct 318 comprises an air path from a duct opening 1502, as illustrated in FIG. 15, to the openings 1404 in the regulator plate 1402. The duct directs air to flow from the exterior of the battery assembly and through the duct and regulator plate 1402 into the cooling paths of each of the modular clips. The air flow then exits the outlet end of the modular clips 304 at the side of the battery module 210 opposite the duct 318. Thus, the duct directs air flow from the exterior of the battery assembly to the regulator plate 1402, where the air flow is directed into the respective cooling paths of each of the plurality of modular clips.

The size and shape of the openings 1404 in the regulator plate 1402 may be configured to control air flow to the cooling path of each of the modular clips. Different shapes/sizes of each of the openings 1404 in the regulator plate may be configured based on a position of the corresponding opening 1404 relative to a duct opening in order to give an approximately equivalent air flow through each of the modular clips 304. Air flow moves more quickly nearer to the opening of the duct. Thus, the openings 1404 at the side of the balancing plate 1402 closer to the duct opening 1502 may be smaller, e.g., to restrict the amount of air flow into the modular clips 304 at that side. The air flow may decrease with distance from the opening 1502 of the air duct 318, and the openings 1404 in the regulator plate 1402 may be increased to adjust the air flow relative to other modular clips 304. Other aspects of the flow pattern also affect the air flow at each modular clip location. The shape and size of each opening 1404 may take into account these additional air flow factors. In another example, the shape of the duct 318 may be configured to balance air flow into the cooling paths of each of the modular clips. Without balancing, the air flow may not be sufficient in certain modular clips 304. The duct opening 1502 may be sized so that the total outlet area through the openings 1404 in the regulator plate 1402 is not greater than the area of the duct opening 1502 in order to at least slightly pressurize the air flow in the duct 318.

Air flow may be driven into the duct 318 with a fan. For example, ambient air may be processed through a dryer or desiccant system before being directed to the duct 318 by a fan. In another example, air may be directed from a Heating Ventilation and Air Conditioning (HVAC) system to cool the battery module. "Air" and "air flow" is not limited to natural ambient air, but may also include a specific gas or ratios of gasses. In one example, the cooling air flow directed through the battery module may be 100% nitrogen.

As the battery module 210 or battery pack 102 may be configured to power an electric vehicle 106, the cooling aspects may be configured to direct air flow into the duct 318 at least partially based on the movement of the electric vehicle 106. Such air flow may be supplemented by a fan at times.

Example aspects of the present invention have now been described in accordance with the above advantages. It will be appreciated that these examples are merely illustrative of aspects of the present invention. Many variations and modifications will be apparent to those skilled in the art.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Furthermore, relative terms such as "lower," "bottom," "top," "upper," etc. may be used to describe an element's relationship to another element, as illustrated in the examples in the drawings. It will be understood that relative terms are intended to encompass different orientations of an apparatus in addition to the orientation depicted in the drawings. By way of example, if an apparatus in the drawings is turned over, elements disclosed as being on the "bottom" or "lower" would be on the "top" or "upper" and elements described as being on the "top" or "upper" would be on the "bottom" or "lower." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A modular clip for a battery module, the modular clip comprising:
    a housing configured to receive a plurality of battery cells, wherein the housing includes:
        a base portion;
        a first wall extending from the base portion of the housing along a length of the housing; and
        a second wall extending from the base portion of the housing along the length of the housing, wherein the housing is configured to receive the plurality of battery cells between the first wall and the second wall, and
    wherein the first wall and the second wall form a linear channel that extends the length of the modular clip to an open end, wherein the linear channel comprises a first gap between the first wall and the plurality of cells that the housing is configured to receive and a second gap between the second wall and the plurality of cells that the housing is configured to receive, wherein the first gap and the second gap are comprised in a cooling path that enables air flow from a first end of the linear channel along the length of the housing to the open end of the linear channel.

2. The modular clip of claim 1, wherein the first gap and the second gap each comprise a height corresponding to at least ¼ of a height of a battery cell.

3. The modular clip of claim 1, wherein the first gap and the second gap each comprise a width within a range of approximately 0.1 mm-5 mm.

4. The modular clip of claim 1, wherein the base portion comprises a plurality of bottom cell recesses, wherein each cell recess is configured to surround a first portion of a battery cell, and wherein the first gap and the second gap of the cooling path are formed above the bottom cell recesses to enable the air flow around a second portion of the battery cell that is not surrounded by a corresponding cell recess.

5. The modular clip of claim 4, further comprising:
a retainer plate including a plurality of top cell recesses, wherein the plurality of top cell recesses are aligned corresponding to an alignment of the plurality of bottom cell recesses, wherein the cooling path is formed between the top cell recesses and the bottom cell recesses.

6. The modular clip of claim 4, wherein each cell recess is configured to receive the battery cell having at least one of a cylindrical exterior or a prismatic exterior.

7. The modular clip of claim 1, further comprising:
the plurality of battery cells positioned within the housing.

8. The modular clip of claim 1, wherein the housing is configured to receive a single row of the plurality of battery cells between the first wall and the second wall.

9. A battery module for a battery pack assembly, the battery module comprising:
a base plate; and
a plurality of modular clips coupled to the base plate, each modular clip including:
a housing configured to receive a plurality of battery cells, wherein the housing includes:
a base portion;
a first wall extending from the base portion of the housing along a length of the housing; and
a second wall extending from the base portion of the housing along the length of the housing, wherein the housing is configured to receive the plurality of battery cells between the first wall and the second wall, and
wherein the first wall and the second wall form a linear channel that extends the length of the modular clip to an open end, wherein the linear channel comprises a first gap between the first wall and the plurality of cells that the housing is configured to receive and a second gap between the second wall and the plurality of cells that the housing is configured to receive, wherein the first gap and the second gap are comprised in a cooling path that enables air flow from a first end of the linear channel along the length of the housing to the open end of the linear channel.

10. The battery module of claim 9, further comprising:
a regulator plate extending along one side of each of the plurality of modular clips.

11. The battery module of claim 10, wherein the regulator plate comprises multiple openings, wherein at least one of the multiple openings communicates air flow to the cooling path formed in each of the plurality of modular clips.

12. The battery module of claim 11, wherein each of the multiple openings controls air flow to the cooling path of a respective modular clip.

13. The battery module of claim 12, wherein the multiple openings comprise at least a different size or a different shape, wherein the different shape or the different size of each of the multiple openings is configured to balance air flow to each of the modular clips.

14. The battery module of claim 11, further comprising:
a duct that surrounds a side of the regulator plate opposite the plurality of modular clips.

15. The battery module of claim 14, wherein the duct forms an air path from a duct opening in the duct to the multiple openings in the regulator plate.

16. The battery module of claim 14, wherein the duct directs air flow from an exterior of the battery to the regulator plate where the air flow is directed into the respective cooling paths of each of the plurality of modular clips.

17. The battery module of claim 9, further comprising:
the plurality of battery cells positioned within each of the modular clips.

18. The battery module of claim 9, wherein the housing is configured to receive a single row of the plurality of battery cells between the first wall and the second wall.

19. The battery module of claim 9, wherein the base portion comprises a plurality of bottom cell recesses, wherein each cell recess is configured to surround a first portion of a battery cell, and wherein the first gap and the second gap of the cooling path are formed above the bottom cell recesses to enable the air flow around a second portion of the battery cell that is not surrounded by a corresponding cell recess.

20. The battery module of claim 19, wherein each modular clip comprises:
a retainer plate including a plurality of top cell recesses, wherein the plurality of top cell recesses are aligned corresponding to an alignment of the plurality of bottom cell recesses, wherein the cooling path is formed between the top cell recesses and the bottom cell recesses.

21. A battery pack comprising:
a plurality of battery modules, each battery module including:
a plurality of modular clips, each modular clip including:
a housing configured to receive a plurality of battery cells, wherein the housing includes:
a base portion;
a first wall extending from the base portion of the housing along a length of the housing; and
a second wall extending from the base portion of the housing along the length of the housing, wherein the housing is configured to receive the plurality of battery cells between the first wall and the second wall, and
wherein the first wall and the second wall form a linear channel that extends the length of the modular clip to an open end, wherein the linear channel comprises a first gap between the first wall and the plurality of cells that the housing is configured to receive and a second gap between the second wall and the plurality of cells that the housing is configured to receive, wherein the first gap and the second gap are comprised in a cooling path that enables air flow from a first end of the linear channel along the length of the housing to the open end of the linear channel.

22. The battery pack of claim 21, wherein each battery module further comprises:
a regulator plate extending along one side of each of the plurality of modular clips.

23. The battery pack of claim 22, wherein the regulator plate comprises multiple openings, wherein at least one of the multiple openings communicates air flow to the cooling path formed in each of the plurality of modular clips, wherein each of the multiple openings controls air flow to the cooling path of a respective modular clip.

24. The battery pack of claim 23, wherein the multiple openings comprise at least a different size or a different shape, wherein the different shape or the different size of each of the multiple openings is configured to balance air flow to each of the modular clips.

25. The battery pack of claim 22, wherein each battery module further comprises:
   a duct that surrounds a side of the regulator plate opposite the plurality of modular clips.

26. The battery pack of claim 21, further comprising:
   the plurality of battery cells positioned within each modular clip.

27. The battery pack of claim 21, wherein the housing is configured to receive a single row of the plurality of battery cells between the first wall and the second wall.

28. The battery pack of claim 21, wherein the base portion comprises a plurality of bottom cell recesses, wherein each cell recess is configured to surround a first portion of a battery cell, and wherein the first gap and the second gap of the cooling path are formed above the bottom cell recesses to enable the air flow around a second portion of the battery cell that is not surrounded by a corresponding cell recess.

29. The battery pack of claim 28, wherein each modular clip comprises:
   a retainer plate including a plurality of top cell recesses, wherein the plurality of top cell recesses are aligned corresponding to an alignment of the plurality of bottom cell recesses, wherein the cooling path is formed between the top cell recesses and the bottom cell recesses.

* * * * *